(12) United States Patent
Sonoda

(10) Patent No.: US 7,586,838 B2
(45) Date of Patent: Sep. 8, 2009

(54) FLEXIBLE M:N REDUNDANCY MECHANISM FOR PACKET INSPECTION ENGINE

(75) Inventor: David Hiroshi Sonoda, Rockville, MD (US)

(73) Assignee: Skylead Assets Limited, Tortola (VG)

( * ) Notice: Subject to any disclaimer, the term of this patent is extended or adjusted under 35 U.S.C. 154(b) by 728 days.

(21) Appl. No.: 10/873,965

(22) Filed: Jun. 22, 2004

(65) Prior Publication Data

US 2005/0281194 A1    Dec. 22, 2005

(51) Int. Cl.
*G01R 31/08* (2006.01)
(52) U.S. Cl. .................. 370/216; 370/220; 370/242
(58) Field of Classification Search .............. 370/216, 370/219, 220, 242
See application file for complete search history.

(56) References Cited

U.S. PATENT DOCUMENTS

| | | | | |
|---|---|---|---|---|
| 5,473,599 | A * | 12/1995 | Li et al. ................. | 370/219 |
| 6,522,732 | B1 * | 2/2003 | Pullen et al. ........... | 379/112.02 |
| 6,931,452 | B1 | 8/2005 | Lamberton | |
| 6,973,503 | B2 | 12/2005 | Basso | |
| 7,003,581 | B1 | 2/2006 | Lamberton | |
| 7,209,435 | B1 * | 4/2007 | Kuo et al. .............. | 370/219 |
| 2002/0184387 | A1 * | 12/2002 | Yamaya et al. ......... | 709/238 |
| 2002/0184487 | A1 | 12/2002 | Badamo et al. | |
| 2003/0039234 | A1 | 2/2003 | Sharma et al. | |
| 2003/0056138 | A1 * | 3/2003 | Ren ...................... | 714/4 |
| 2003/0093557 | A1 | 5/2003 | Giraud | |
| 2004/0008694 | A1 | 1/2004 | Guo | |
| 2004/0010731 | A1 | 1/2004 | Yu | |
| 2004/0078619 | A1 * | 4/2004 | Vasavada ............... | 714/4 |
| 2004/0083403 | A1 * | 4/2004 | Khosravi ............... | 714/13 |
| 2005/0177762 | A1 | 8/2005 | Singh | |
| 2005/0198381 | A1 | 9/2005 | Rorie | |
| 2005/0201372 | A1 | 9/2005 | Hares | |
| 2005/0257002 | A1 | 11/2005 | Nguyen | |
| 2006/0005231 | A1 * | 1/2006 | Zuk et al. .............. | 726/3 |
| 2006/0077922 | A1 | 4/2006 | Geilfus | |

* cited by examiner

*Primary Examiner*—Kwang B Yao
*Assistant Examiner*—Nguyen Ngo
(74) *Attorney, Agent, or Firm*—Schwabe Williamson & Wyatt P.C.

(57) ABSTRACT

A system, mechanism and method are provided for inspecting packets. Application processing engines (ASEs) inspect an IP packet flow of subscribers. It is determined whether any of the ASEs is operating as a master and if not one of the ASEs is elected. The master forms one or more redundancy group of the ASEs based on a configuration of IP packet flow for subscribers determining for the redundancy group how many active ASEs are needed to support an operational configuration of the IP packet flow of the subscribers. If there is already an active ASE performing a determined configured function, the master allows the function to continue to be performed by that active ASE and assigns other configured functions to available ASEs with ASEs not assigned a configuration serving as standby ASE in the redundancy group. The active ASEs multicast or broadcast subscriber state data to each of the standby ASEs. The standby ASEs maintain received subscriber state data for each active ASE. A standby ASEs is activated when one of the active ASEs fails, the activated ASE may advertise the interfaces of the activated standby ASE and if necessary the routing advertisements that the failed ASE was advertising.

11 Claims, 9 Drawing Sheets

FLEXIBLE M:N REDUNDANCY MECHANISM FOR PACKET INSPECTION ENGINE

FIELD OF THE INVENTION

The invention relates generally to a mechanism, a system and a method involving packet inspection engines or entities that are in the path of a packet stream and provide packet inspection functions for various purposes. More particularly, the invention relates to a mechanism, system and a process involving packet inspection engines in which there is a requirement for redundancy in combination with a requirement of quick replacement of a failed inspection engine without the loss of information as to the processing state.

BACKGROUND OF THE INVENTION

Many complex solutions have been developed over time to provide processing redundancy. Many of these solutions rely on having either one system backing up several, or several systems backing up one system. Solutions which provide m for n redundancy often require complex configuration and coordination. In addition, for packet inspection services which require knowledge of subscriber state, additional protocol processing and operation is often required to recreate the subscriber state, often with concomitant delays in recovering operation.

VRRP or Virtual Router Redundancy Protocol is a protocol which allows several routers on a multiaccess link to utilize the same virtual IP address. VRRP is designed to eliminate the single point of failure inherent in the static default routed environment. The VRRP router controlling the IP address(es) associated with a virtual router is called the master, and forwards packets sent to these IP addresses. The master router is elected with the other routers acting as backups in case of the failure of the master router. Any of the virtual router's IP addresses on a LAN can then be used as the default first hop router by end-hosts. The advantage gained from using VRRP is a higher availability default path without requiring configuration of dynamic routing or router discovery protocols on every end-host. Using VRRP allows host systems to be configured manually or via Dynamic Host Configuration Protocol (DHCP) with a single default gateway, rather than running an active routing protocol. DHCP is the protocol for automating the configuration of computers that use Transmission Control Protocol/Internet Protocol (TCP/IP). VRRP provides a function similar to a Cisco Systems, Inc. proprietary protocol named Hot Standby Router Protocol (HSRP) and with a function similar to a Digital Equipment Corporation, Inc. proprietary protocol named IP Standby Protocol. VRRP provides only m backups (m redundancy) for each one primary unit. This m for 1 redundancy presents significant limitations as to redundancy possibilities and situations. VRRP also does not optimally utilize the redundant units.

SUMMARY OF THE INVENTION

The invention provides a mechanism, system and process for applications such as packet processing where it is important that solutions be highly redundant using an entity such as a node or other interface to provide a product to an IP service provider. The node works with the actual IP packet flow of subscribers. The invention allows for simple configuration and simple deployment of a full m for n redundancy mechanism with full subscriber state recovery without additional protocol participation.

According to the invention, a packet inspection engine system with m:n redundancy mechanism has n active application service engines inspecting packets from an actual Internet protocol (IP) packet flow of subscribers. Further, m redundant Application Service Engines (ASE or APE) are provided. Each of said n active ASEs multicast changes of subscriber state to each of the m redundant ASEs. Each of the m redundant ASEs maintains received changes of subscriber state as active ASE status data for each active ASE. A redundant or standby ASE is selectively activated when one of the n active ASEs fails with an activated formerly redundant ASE having all of the subscriber state information of the failed ASE.

The IP packet traffic is directed to the ASEs based on interface addresses that are known to neighbors that are advertised with Address Resolution Protocol (ARP) and tunnel termination points and address pools that are advertised in routing pools, or configured in other parts of the network to be tied to an interface address. When activated, the formerly redundant ASE advertises interface addresses and if necessary the routing advertisements that the failed ASE was advertising. The activated formerly redundant ASE is selectively activated by one of the ASEs acting as a master ASE.

The mechanism, method and system use one of the ASEs acting as a master. The master ASE is established by an election/re-election. Each ASE that detects that he can not reach the master starts participating in an election. All of the ASEs which can reach each other, and which cannot reach the current master, will conduct the election. The fact that one ASE cannot reach the master does not cause another ASE to start participating in the election. The election/re-election includes participation by all of the ASEs through exchanging messages among all of the ASEs. The master ASE sends regular hello messages to let other ASEs know that the master ASE is still alive.

The master ASEs may be established upon determining that none of the ASEs are operating as a master and then electing one of the ASEs as a master. This may be done by each ASE exchanging multicast or broadcast messages indicting a software revision and configuration revision and a commissioned IP address. The ASE with the most current software and configuration, and within that, with the lowest identity, becomes master ASE after examining the messages.

The master may be used to form a redundancy group of the active and redundant (standby) ASEs. The master determines for the redundancy group how many active ASEs are needed to support an operational configuration of the IP packet flow of subscribers based on a configuration of IP packet flow for subscribers. If there is an active ASE performing a determined configured function, the master may allow the function to continue to be performed. Otherwise, the master may assign other configured functions to available ASEs with ASEs not assigned a configuration serving as the redundant ASEs in the redundancy group.

The master may also be used for updating software to a new software revision or release for the active and redundant ASEs. A prefered update method and system includes first setting the software release data of the master ASE to the new software release (but not yet resetting the mater ASE to run the new release software). The master then may update the active ASEs and the standby ASEs to the new software. Subsequently, the master is reset with the new release.

According to another aspect of the invention, a method is provided for inspecting packets. Application Processing Engines (also referred to as ASEs) inspect an IP packet flow of subscribers. It is determined whether any of the ASEs is operating as a master and if not, one of the ASEs is elected.

The master forms one or more redundancy group of the ASEs based on a configuration of IP packet flow for subscribers determining for the redundancy group how many active ASEs are needed to support an operational configuration of the IP packet flow of the subscribers. If there is already an active ASE performing a determined configured function, the master allows the function to continue to be performed by that active ASE and assigns other configured functions to available ASEs with ASEs not assigned a configuration serving as standby ASE in the redundancy group. The active ASEs multicast subscriber state data to each of the standby ASEs. The standby ASEs maintain received subscriber state data for each active ASE. A standby ASEs is activated when one of the active ASEs fails. The activated ASE may advertise the interfaces of the activated standby ASE and if necessary the routing advertisements that the failed ASE was advertising.

According to another aspect of the invention, a system and a method are provided for backed up processing. The method includes providing application processing engines (ASEs) for processing IP packets and determining if any of the ASEs is operating as a master and if not electing one of the ASEs as a master based on factors including the software release being used by the ASE. The method uses the master to assign some of the ASEs as active ASEs and some of the ASEs as standby ASEs. The software release version the active ASEs and the standby ASEs are running is updated by setting the software release data of the master ASE to the new software release, updating the active ASEs and standby ASEs to the new software and subsequently resetting the master with the new release.

The invention represents a significant improvement on the redundancy mechanisms used in the past including the redundancy features used in the system described in U.S. application Ser. No. 09/811,204 (the contents of which are hereby incorporated by reference) and related publication US-2002-0181476-A1 (the contents of which are hereby incorporated by reference). Systems that provide packet inspection can benefit from the mechanism, system and process of the invention for control applications and application processing engines, and even routers. This invention also represents a significant improvement over the state of the art in such redundancy, as represented, for example, by VRRP and Cisco Systems, Inc. proprietary protocol HSRP.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

FIG. 7 is a schematic view showing the redundancy group with a new ASE (processor blade) getting the state information from the active ASEs of the redundancy group that the master ASE has assigned the new ASE to participate in.

DESCRIPTION OF THE PREFERRED EMBODIMENT

Figure 1:
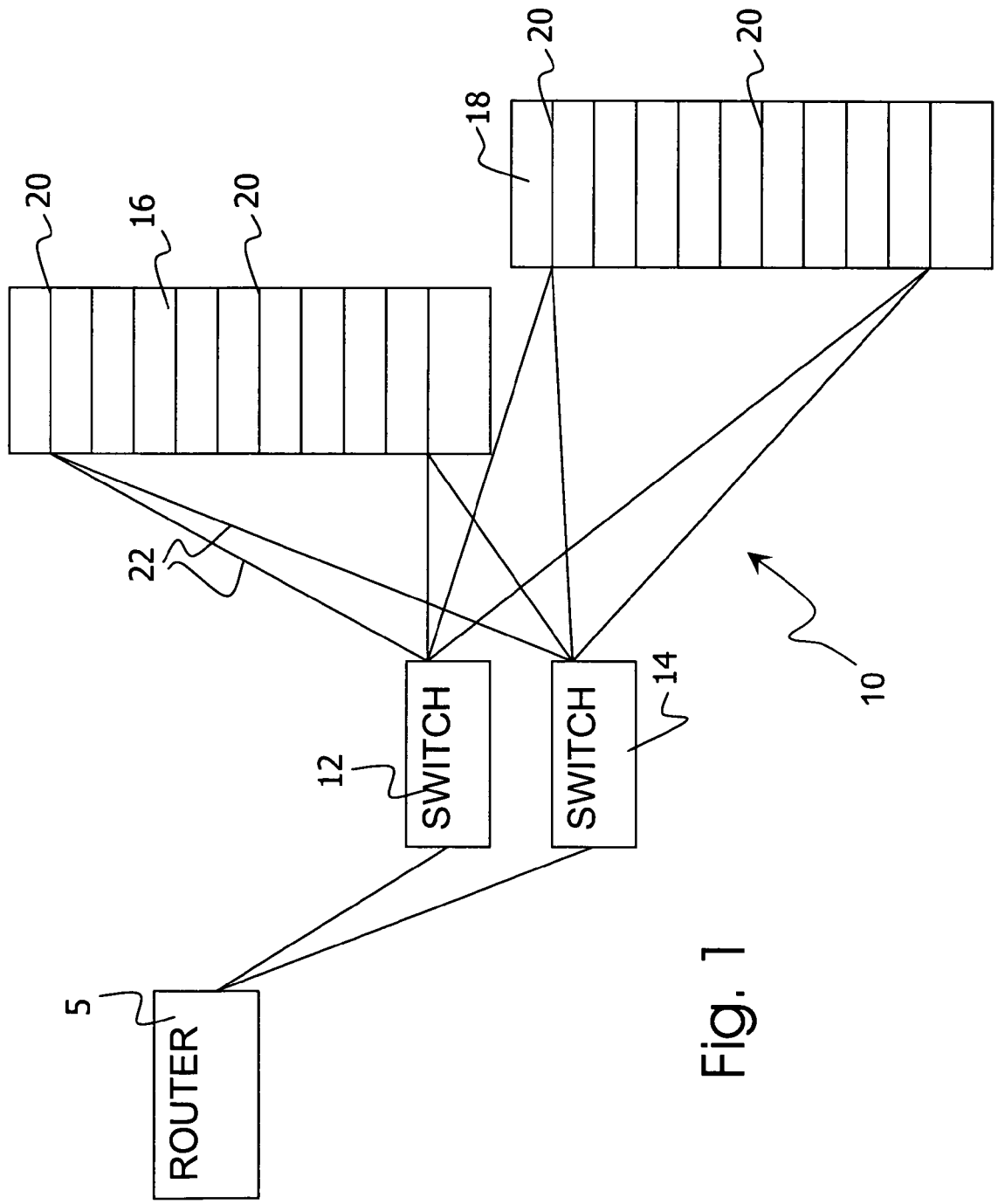
FIG. 1 is a schematic view showing a possible physical arrangement embodying the mechanism, system and process of the invention.

Referring to the drawings in particular, the invention may be provided by a physical system arrangement as shown in FIG. 1. The system arrangement 10 is connected to a router or switching device 5. The router 5 receives and sends packets to subscribers 7 (FIG. 2) and receives and sends packets to the Internet 9 or other sources of content. The router 5 directs packet traffic to the system arrangement 10 via a switch 12 or via a set of switches 12 and 14. The switches 12 and 14 may be ethernet switches (e.g., gigabit ethernet). In the embodiment shown packets are inspected and/or processed with application processing engines (ASEs) using a chassis 16 with a plurality of processing blades 20. Each processing blade 20 is connected to each of the switches 12, 14 via gigabit ethernet connections 22 or other similar connection. The ASEs may also be implemented using individual computers or other processor arrangements. For example, the invention may be realized using multiple personal computers. The preferred embodiment employs multiple Intel processor blades 20 in an Intel compact PCI chassis 16. In the embodiment of FIG. 1, a further chassis 18 is provided with further processor blades 20. Other and further processing capabilities may be provided as needed based on the particular processing situation encountered.

Figure 2:
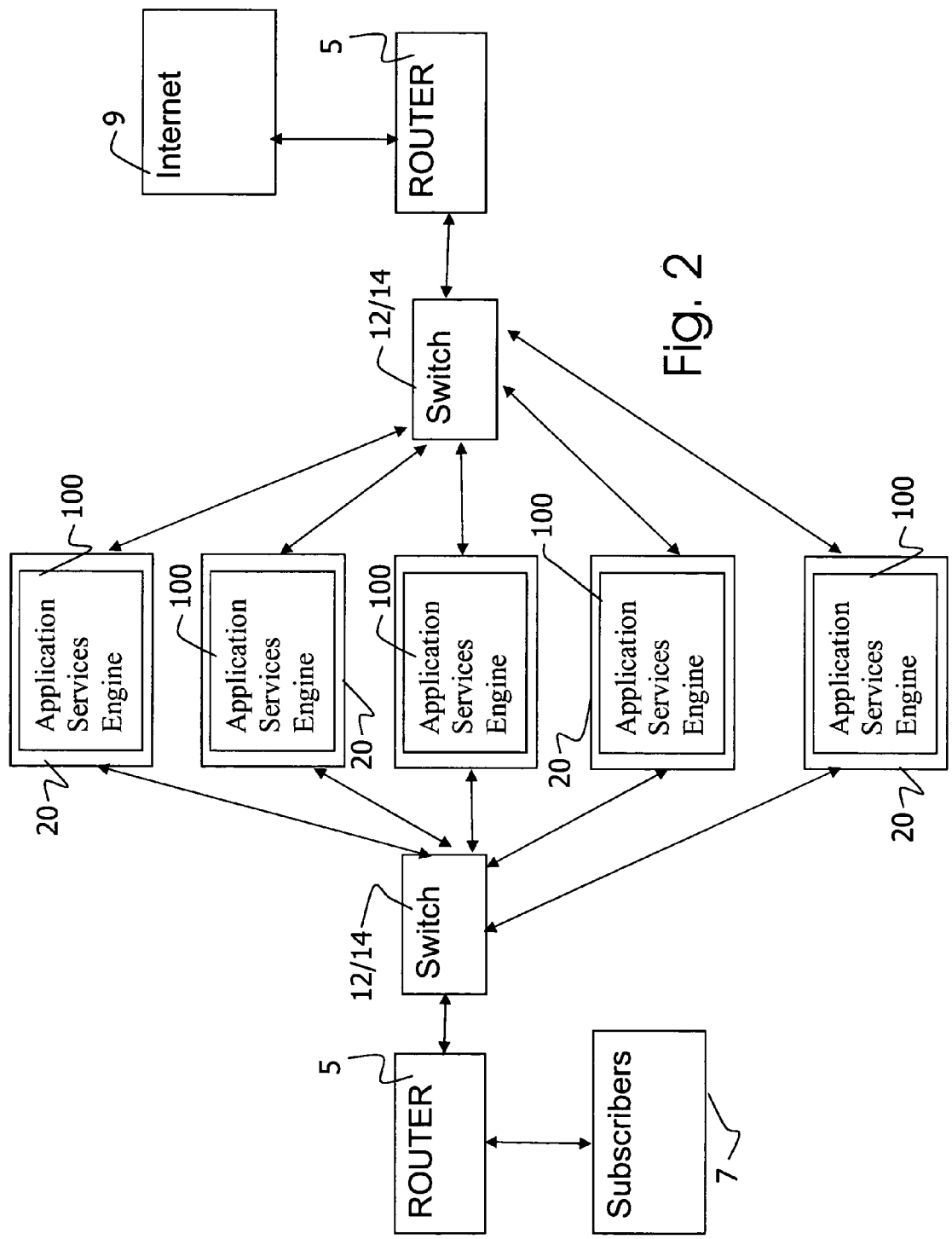
FIG. 2 is a schematic view showing a logical arrangement embodying the mechanism, system and process of the invention.

The physical arrangement as shown in FIG. 1 is used to provide a virtual system as shown in FIG. 2. Specifically, the physical processing blades 20 are configured to do any processing required based on traffic being directed to the blades 20 from the access devices switch or router 5 and/or switches 12, 14 or other access device via a virtual local area network (VLAN) established by addressing via IP (Internet protocol) addresses. The switches 12 and/or 14, are configured to use the active blades 20 of the system 10 as their next hop for subscriber traffic. Traffic for subscribers is directed to the correct processing blades 20 of the system 10 either by routing advertisements from the active blades 20 or by statically configured routing for directing traffic to the interface addresses of the active blades 20. This configuration causes all traffic to pass through the active components (the active blades 20) of the system 10, enabling the system 10 to perform packet inspection and processing. As the active blades 20 are in the data flow, it is often important that failures be recovered quickly.

FIG. 2 shows a logical embodiment of the invention. The logical embodiment comprises ASEs 100 as part of the system 10 for processing packets received and sent to subscribers 7 and the Internet 9. In the preferred embodiment, the ASEs 100 are features of the packet inspection system 10 in a Mobile Services Delivery System (MSDS). The MSDS is a single point for the creation and delivery of mobile data service policies including policies for access networks (roaming, home, 2.5 G, 3 G, WLAN), charging (postpaid, prepaid, content, event, promotion, time of day), and forwarding (content control, content or event limits). Operators can use the system 10 to create dynamic policies based on the instantaneous subscriber state. Although the preferred embodiment shown is for this purpose, the invention can be applied to any packet inspection engine situation. The invention can be applied to Digital Subscriber Loop (DSL), or cable modems with signaled subscriber features, providing redundancy for the interacting packet inspection engines.

The underlying system 10 directs traffic to active ASE components 100 via two techniques. First, the interface addresses that are known to neighbors are advertised with Address Resolution Protocol (ARP). Second tunnel termination points and address pools are advertised in routing pools, or configured in other parts of the network to be tied to an interface address. The system 10 provides the processing needed in conjunction with the configuration of active component ASEs 100A. The active ASEs 100A are assigned to a configuration (a number (n) of active ASEs 100A support a configuration). A number (m) of inactive redundant or standby ASEs 100S cooperate with the active ASEs 100A to form one or several redundancy groups 300, 301, 302, etc. to support the configuration.

Figure 3:
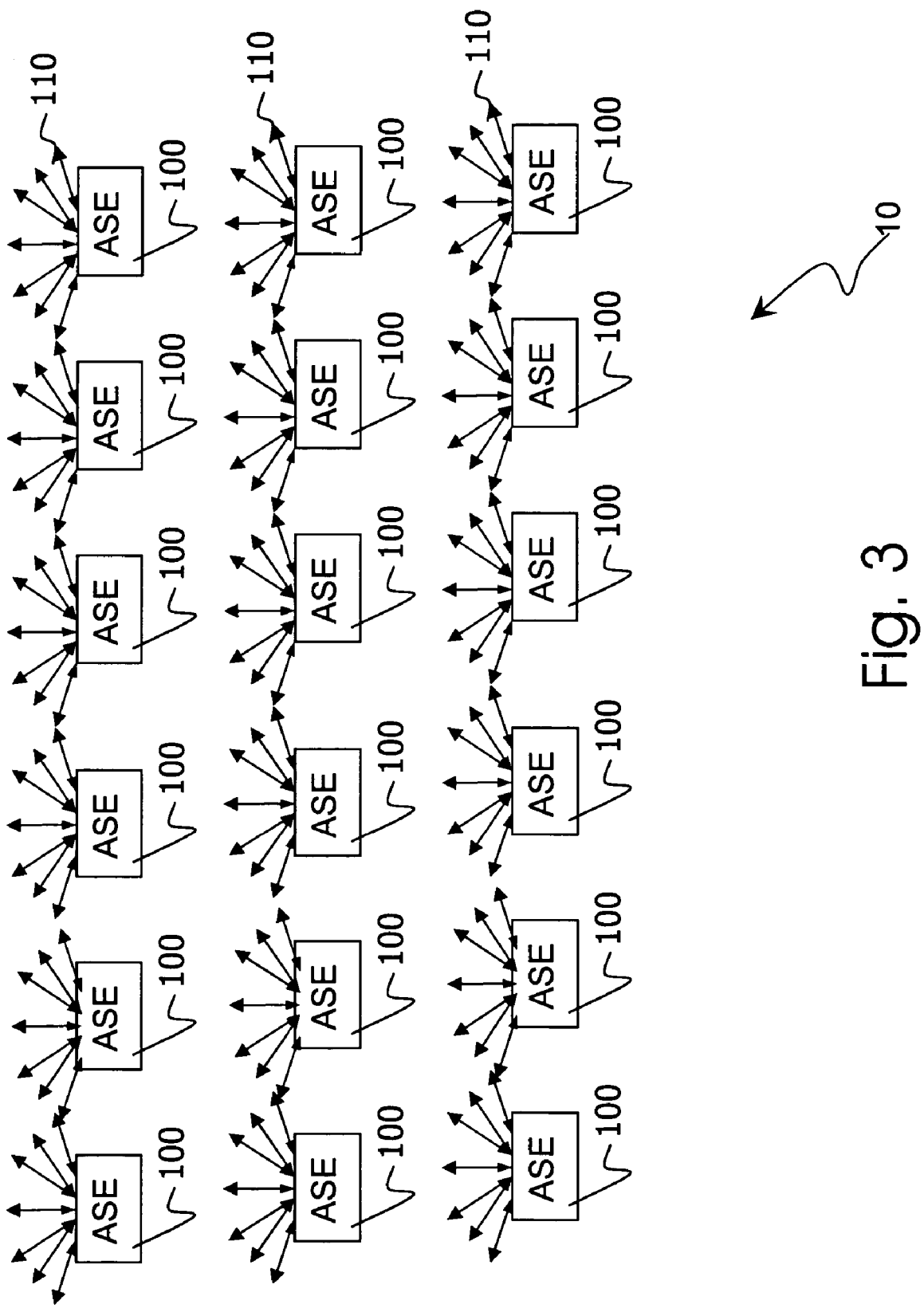
FIG. 3 is a schematic view showing a the application processing engines (ASEs) of the system with election of a master according to the invention.

The invention makes use of six logical aspects. The first aspect is master election/re-election for the system 10, comprising the ASEs 100 that can talk to each other. When an ASE 100 starts and/or when it determines that it cannot reach the master ASE 100M, an election is held. All of the ASEs 100 which can reach each other, and which cannot reach the current master, will conduct the election. The fact that one ASE 100 cannot reach the master does not cause another ASE to start participating in the election. The election/re-election includes participation by all of the ASEs 100 through exchanging messages 110 among all of the ASEs. Messages 110 are exchanged (multicast or broadcast) by the ASEs 100, and the master ASE 100M is elected. To do this, each ASE 100 multicasts a message 110 indicting the revision of software and configuration it has available, and its commissioned IP address. All ASEs 100 in the system 10 participate in this election as shown in FIG. 3. If the set of ASEs 100 has gotten partitioned, each group of communicating ASEs will hold a separate election. An isolated node or blade 20 which has no control communication with any other ASE refrains from becoming a master. All ASEs 100 in the system 10 examine the information they receive for a period of time after coming up. The ASE 100 with the most current software and configuration, and within that with the lowest identity value (such as lowest IP Address or MAC Address to break a deadlock), becomes master ASE 100M after examining the messages 110.

Figure 4A:
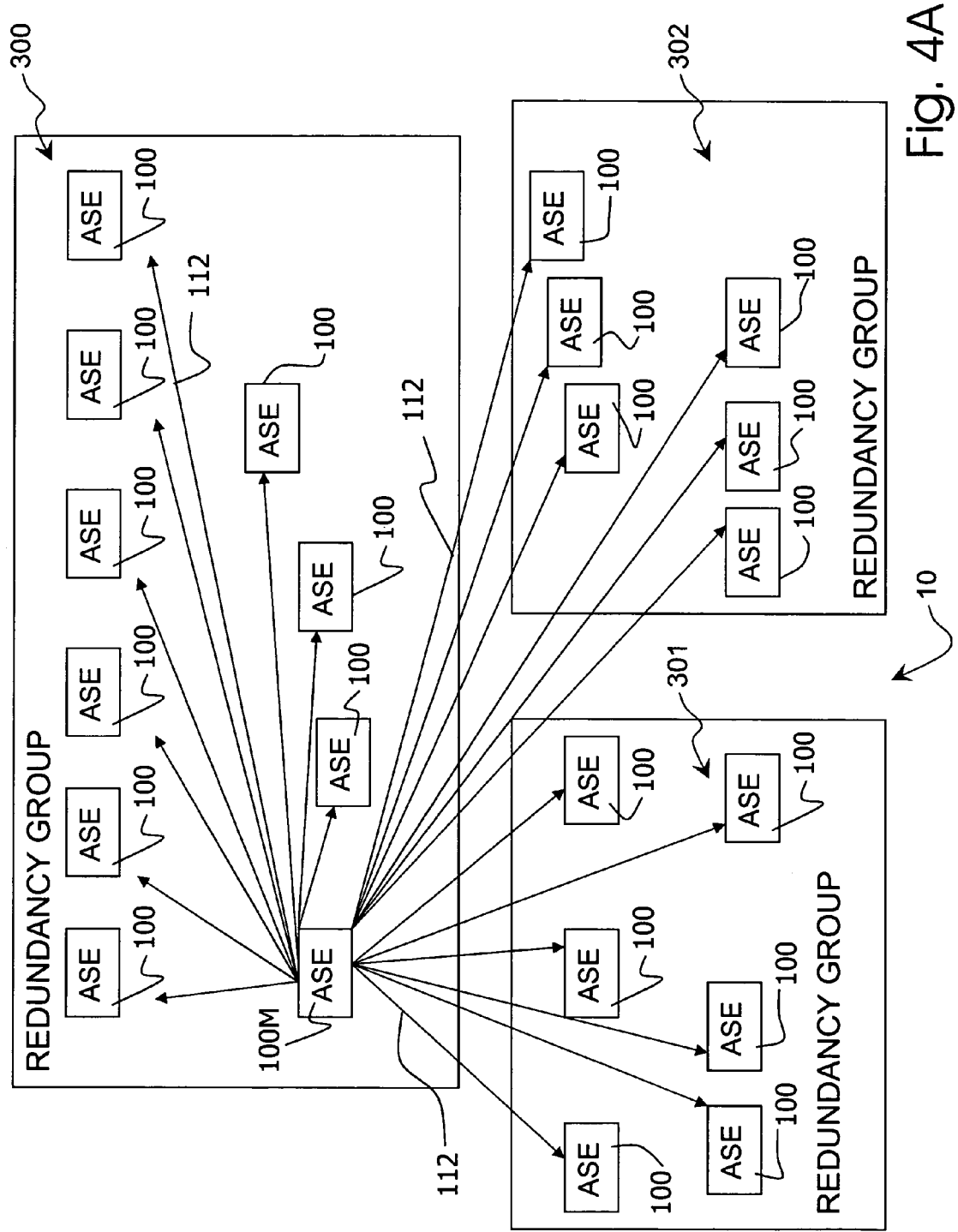
FIG. 4A is a schematic view showing an elected master sending hello messages to ASEs of various redundancy groups.

Thereafter, as long as it is operational the master ASE 100M sends regular hello messages 112, as shown in FIG. 4A, to let other ASEs 100 in all redundancy groups 300, 301, 302, etc. know that the master ASE 100M is still alive. Note that if there is a master ASE 100M running, the election is preempted. The existence of the master 100 M (preferably the existence of such a master 100M with the newest software release) prevents another ASE 100 in the system 10 from becoming the master.

Figure 4B:
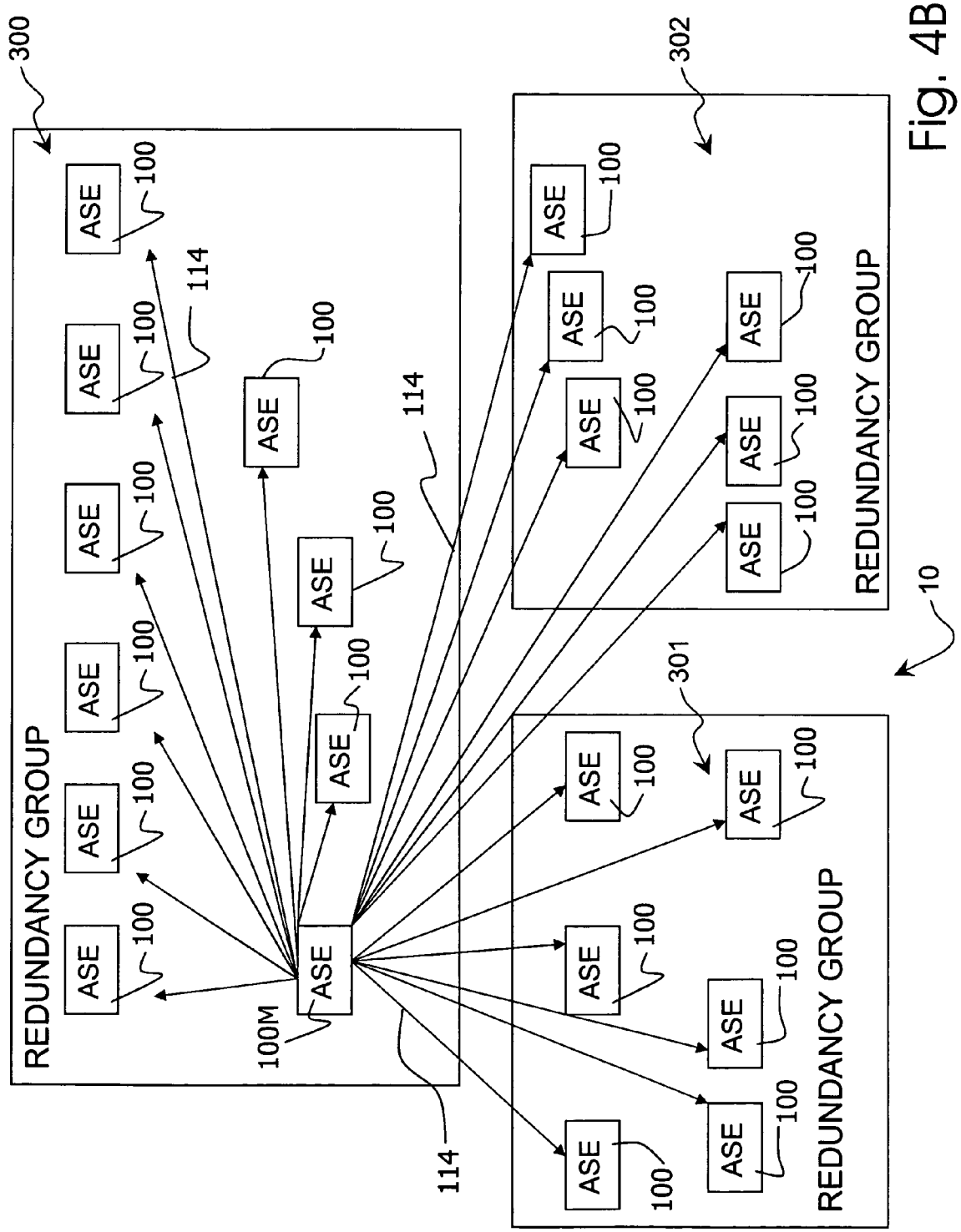
FIG. 4B is a schematic view showing an elected master sending a newer software and/or configuration to ASEs of various redundancy groups.

In the second logical aspect, if the master ASE 100M determines that it has newer software or configuration than some other ASE 100 in the system 10, then the master ASE 100 sends the newer software and/or configuration as shown at 114 in FIG. 4B, to the ASEs 100 with the older information. If the existing master ASE 100M determines that an ASE 100 that is coming up (such as a newly added ASE) is a better master ASE 100M, then all the ASEs 100 in the current system 10 are reset to allow the new ASE to come up as the master 110M. As the blades 20 that have been reset come up again, they will pull the latest software and/or configuration from the new master ASE 100M. As this method of software upgrade is disruptive, the preferred embodiment includes a method for a more graceful upgrade of the software. Accordingly, the Master ASE is given the newer software for installation. The invention then practices a method for such software upgrade or change in software version in which the master ASE 100M sets its software release status to a new version number of the new software (although the master ASE 100M is not running the new software). The master ASE 100M upgrades at least one standby ASE 100S, and then upgrades the active ASEs 100A. With this there are upgraded standby ASEs 100S ready to take over the functions of the active ASEs 100A. The master 100M then upgrades the various other ASEs 100 and 100S as shown in FIG. 4B. Thus, the upgrade process causes no service disruption or loss of state information. When the master ASE 100M determines that all of the known ASEs 100 are running the new software release, the master ASE 100M resets itself so that it will come up with the new software release. This procedure is useful as it avoids the possibility of a standby ASE 100S coming-up and causing a new election of a master based on the master ASE 100M having the older software version.

Figure 5A:
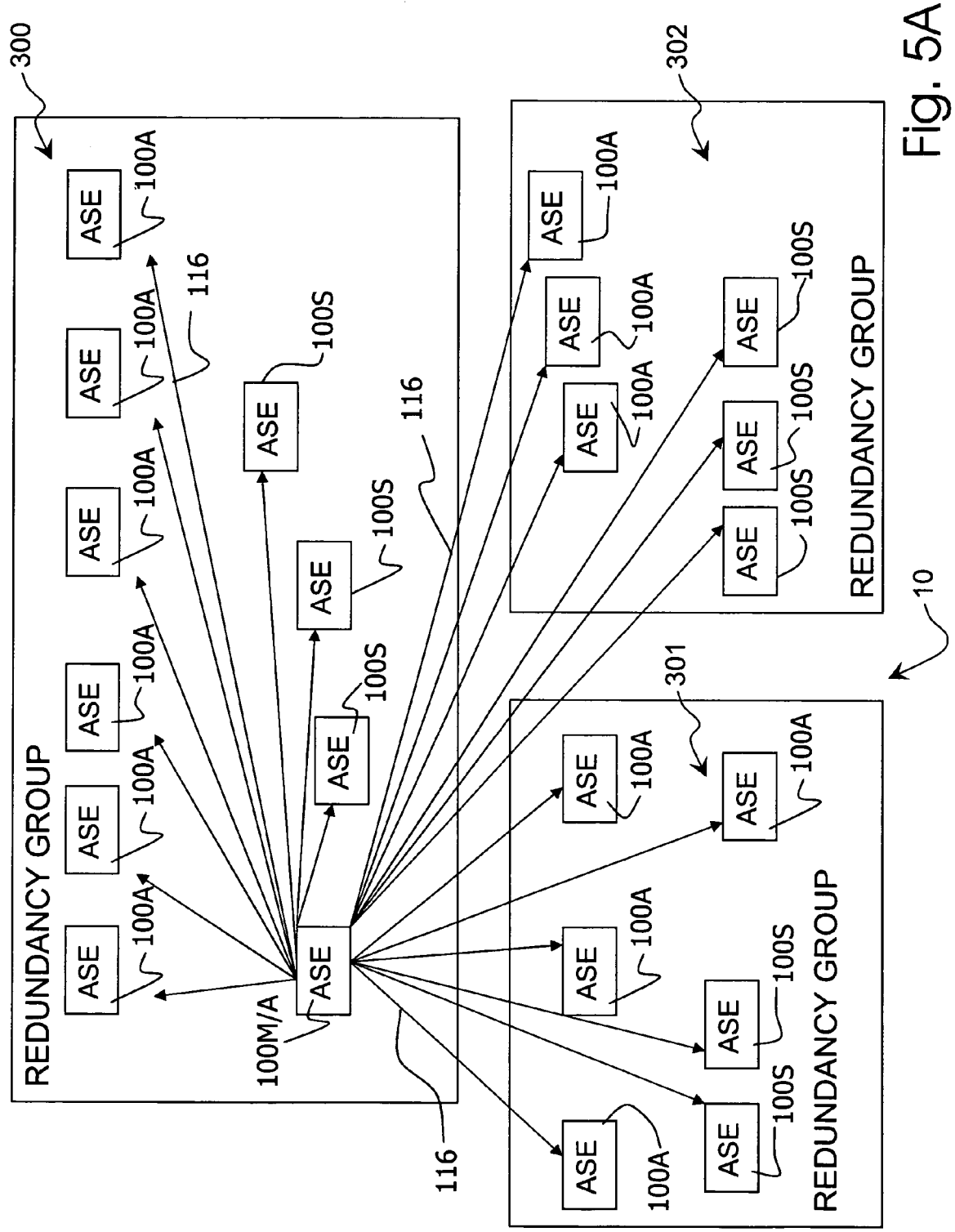
FIG. 5A is a schematic view showing redundancy groups and the assignment of ASEs to be active ASEs in one of the redundancy groups or to be standby ASEs in that redundancy group.

The third logical aspect commences once a master ASE 100M is elected. As shown in FIG. 5A, several redundancy groups 300, 301, 302, etc. are established. The operational configuration is the basis for the number of redundancy groups 300, 301, 302, etc. of ASEs 100, that number of redundancy groups 300, 301, 302, etc. required for the operational configuration. The system 10 uses master ASE 100M to assign components (blades 20) to fill the active and standby ASE roles as needed to meet the configuration. The master ASE 100M then determines for each redundancy group 300, 301, 302, etc. how many active ASEs 110A are needed to support the operational configuration. For each required ASE 100, the master ASE 100M determines if there is already an active ASE 100A performing that/those configured function (s). If so, that ASE 100A continues to perform that function. Additional configurations which are not currently being serviced are given to available ASEs 100 with the ASE 100M assigning configurations as shown at 116. This assigning 116 may, for example, include giving some of the additional configurations to the master ASE 100M. The ASEs 100 that are assigned and receive configurations then become active ASEs 100A, performing the configured functions they are assigned. The master ASE 100M assigns any remaining ASEs 100 (remaining processor components) to the redundancy groups 300, 301, 302, etc. as standby ASE 100S as shown at 116 in FIG. 5A. The master ASE 100M may either be an active ASE 100A or a standby ASE 100S or not participate in the redundancy group 300. However, with the embodiment shown, the master ASE 100M makes itself an active ASE 100 M/A in a redundancy group 300 as it knows it is functioning and is ready to take on processing functions.

Figure 5B:
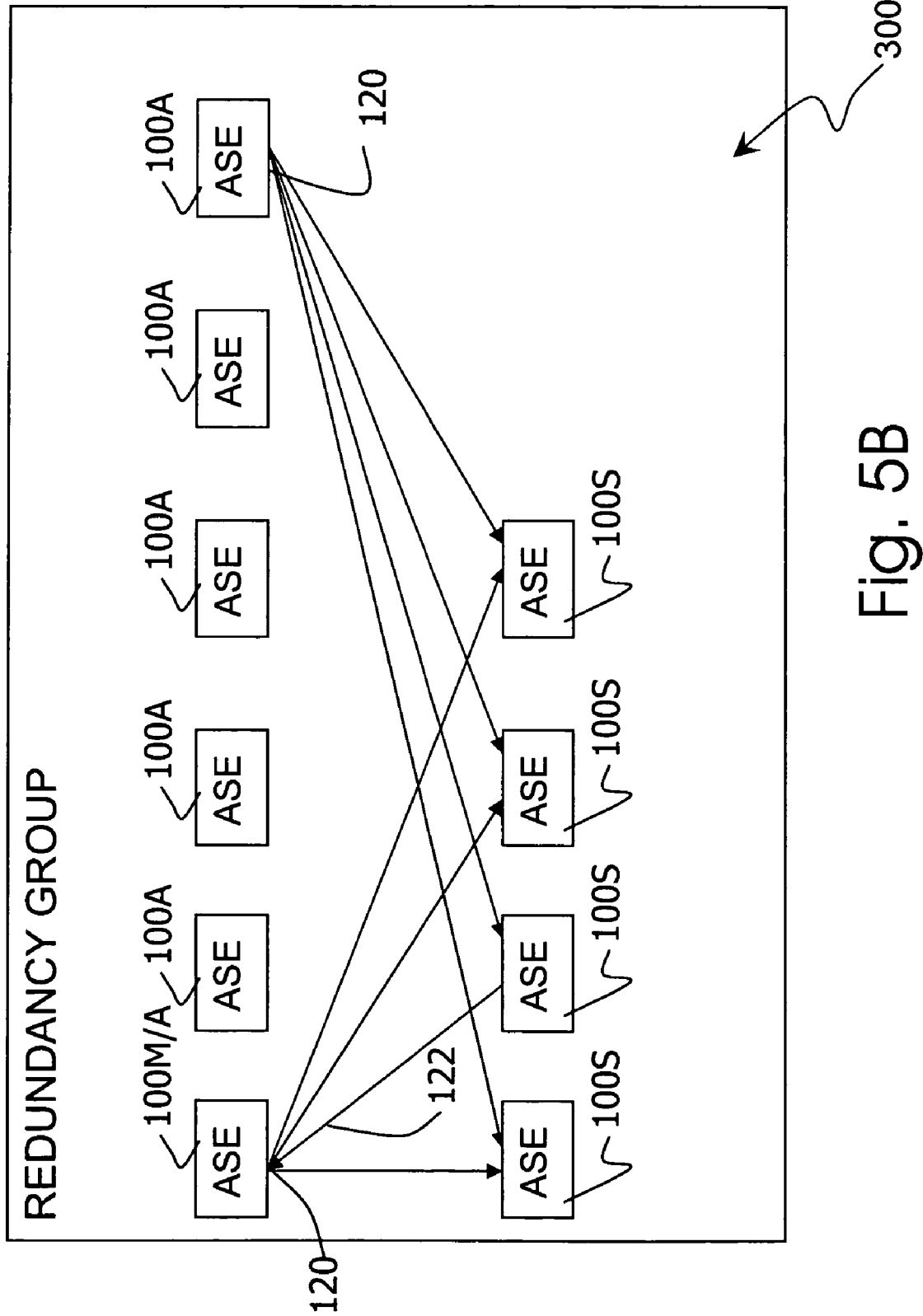
FIG. 5B is a schematic view showing the redundancy group with ASEs sending multicast subscriber status messages to all non-active ASEs in the redundancy group.

In the fourth logical aspect, during operation, all active ASEs 100A in a redundancy group 300 multicast all changes of subscriber state (accounting, service bindings, etc.) as shown schematically at 120 in FIG. 5B to all standby ASEs 100S in the redundancy group 300. Even when no state updates occur, each active ASE 100A sends an update so that lost information can be recovered and so that the master ASE 100M knows that the active ASE 100A is still functioning. Sequence numbers and retransmission mechanisms ensure that this transmission is reliable. In the preferred embodiment, each message sent by an active ASE 100A has a sequence number. If a standby ASE 100S receives an update, and determines, due to a gap in the sequence numbers, that it is missing information, it sends a request 122 to the active ASE 100A whose information it is missing, requesting that the information be sent. This request is retransmitted until the missing information is received. The process whereby active ASEs 100A provide status data to redundant ASEs 100S provides active mirroring, where the subscriber status data for any of the ASEs 100A is also in the possession of each standby ASE 100S.

Figure 6:
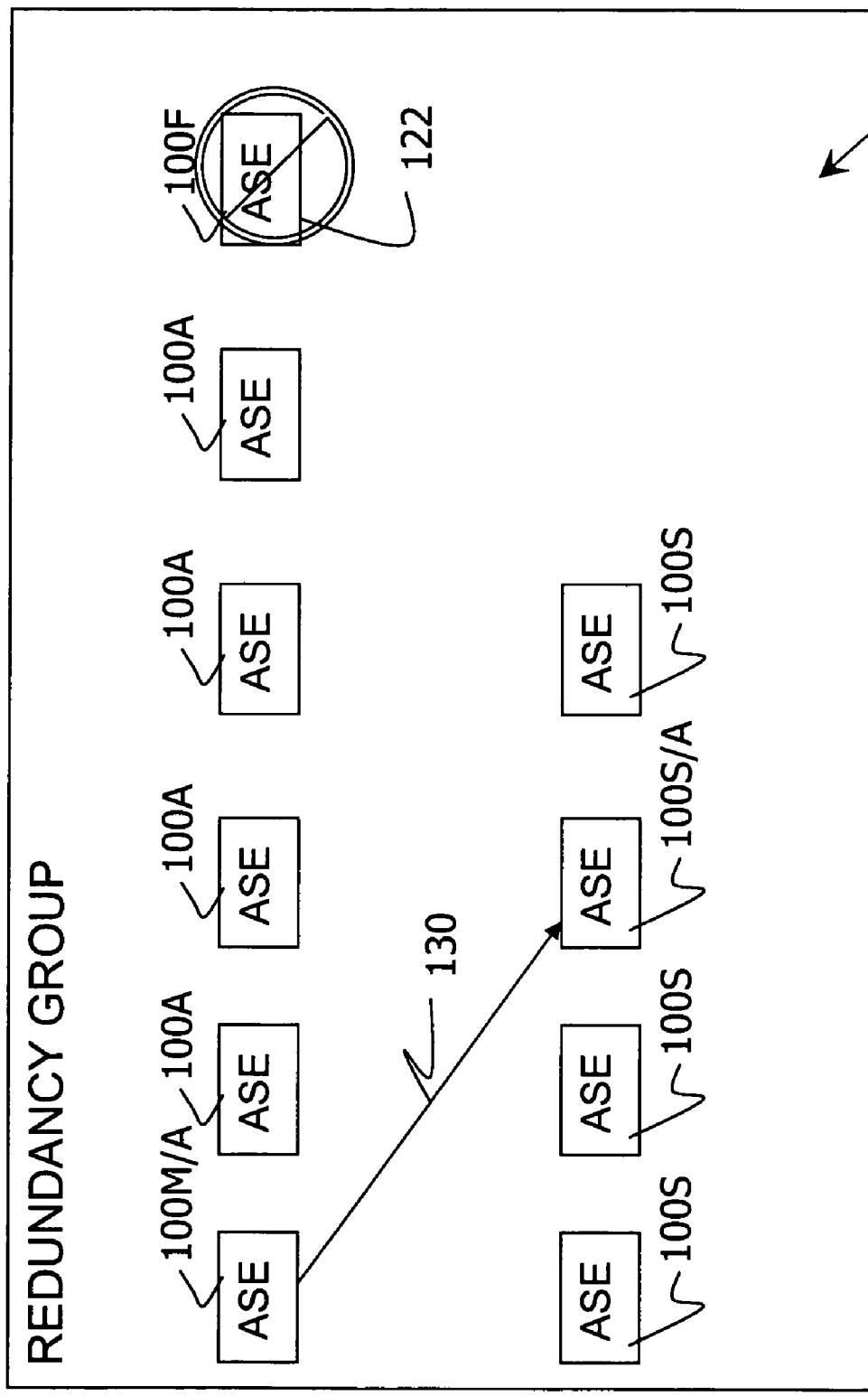
FIG. 6 is a schematic view showing the redundancy group with a failed ASE and with a non-active ASE being activated.

In the fifth logical aspect (FIG. 6), when an active ASE 100A fails (any type of hardware or software failure) as indicated at 122, the master ASE 100M/A detects this failure by noting the absence of messages from that previously active failed ASE 100F. The master ASE 100M/A selects a standby ASE 100S from the redundancy group 300 that the failed ASE 100F was in, and directs that standby ASE 100S as shown at 130 to assume the functions of the failed ASE 100F. The standby ASE 100S already has all of the configuration and all of the state (subscriber state) information from the failed ASE 100A, so it can promptly assume the functions of the failed ASE 100A. If the master ASE 100M fails, a new election is held.

The selected standby ASE 100S/A, now active, advertises the interfaces (and if necessary the routing advertisements) that the failed 100F was advertising. The ASE 100S/A receives the traffic the failed ASE 100F was receiving, and processes it just as the failed ASE 100F would have.

Figure 7:
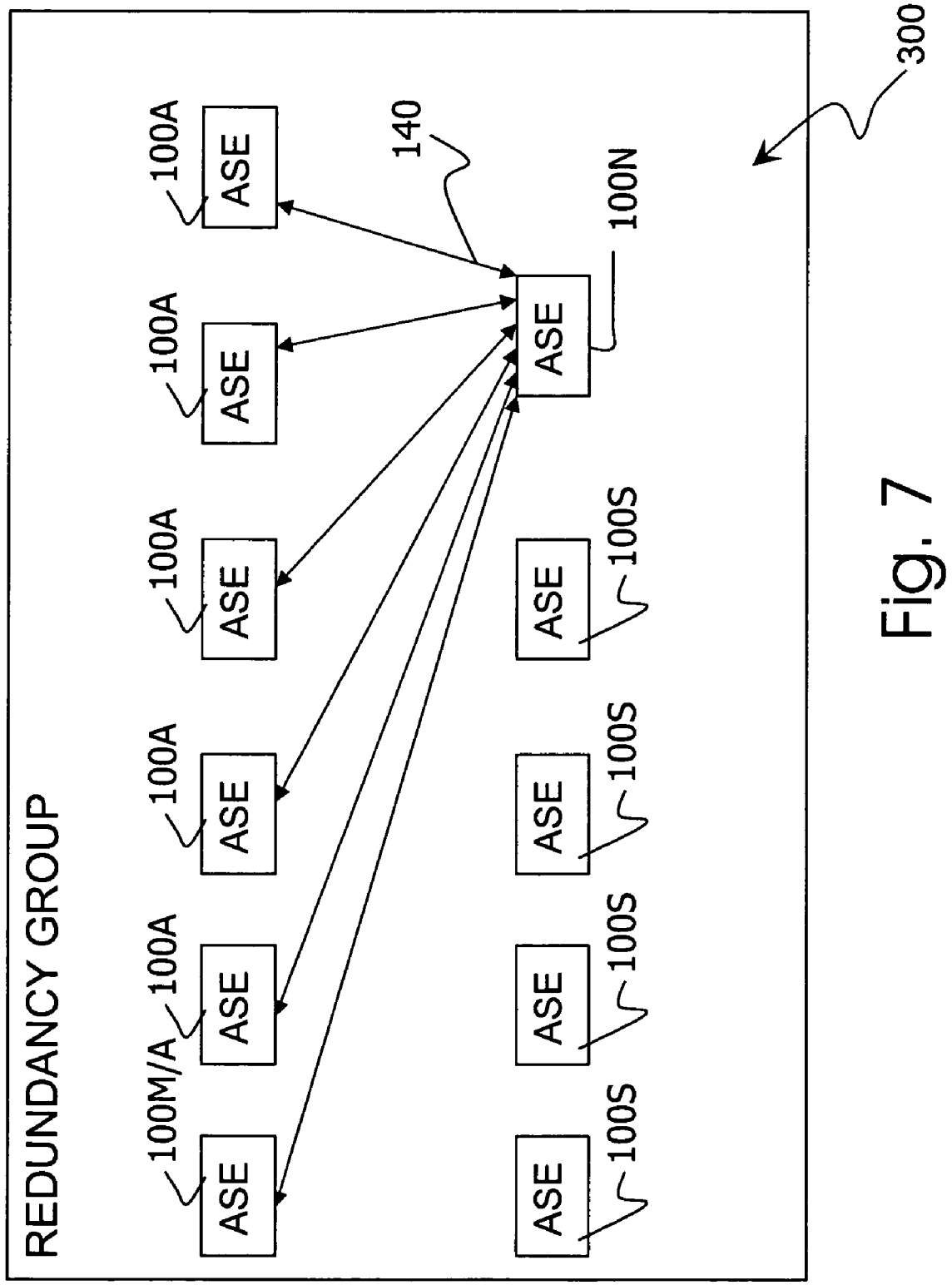

In the sixth logical aspect, if new ASEs 100N are added to the system as shown in FIG. 7, they become additional standby ASEs 100S. The new ASE 100N listens to the multicast messages and detects the Master ASE 100M. It sends its own liveness message, after which the Master ASE assigns the new ASE 100N to a redundancy group. The new ASE 100N then uses reliable transmission protocols (e.g., TCP, SCTP, etc.) to retrieve all previous state information from all the active ASEs in the redundancy group as shown at 140, and then maintains that state information using the mechanism described above. In the event that the new ASE 100N has a newer software release or a newer configuration than the current master ASE 100M, then the new ASE100N takes over as master ASE, and distributes its newer software and/or configuration to all ASEs 100 in the system 10.

While a specific embodiment of the invention has been shown and described in detail to illustrate the application of the principles of the invention, it will be understood that the invention may be embodied otherwise without departing from such principles.

What is claimed is:

1. A packet inspection engine system, comprising:
    n active application service engines (active ASEs) configured to inspect packets from Internet protocol (IP) packet flows of subscribers and to multicast updated changes of subscriber state; and
    m redundant application services engines (redundant ASEs) configured to maintain received changes of subscriber state as active ASE status data for each active ASE;
    wherein at least one of said ASEs is configured to be elected by said ASEs to be a master ASP, to operate differently on election from other ones of the m redundant ASEs. To detect on election failures of any of the active ASEs, and to selectively activate on detection one of the other m redundant ASEs to substitute for a failed ASEI;
    wherein n and m are integer; and
    wherein the ASEs are configured, such that, the master ASP forms a redundancy group of ASEs, determine how many active ASEs are needed in the redundancy group to support an operational configuration of the IP packet flows of subscribers, determine if there is already an active ASE performing a determined configured function and if so, allow the function to continue to be performed and assign other configured functions to available ASEs not assigned a configuration.

2. The system according to claim 1, wherein the IP packet flows are directed to the ASEs based on one or more of interface addresses that are known to neighbors that are advertised with address resolution protocol (ARP).

3. The system according to claim 1, wherein said activated redundant ASE is configured to advertise interface addresses and if necessary the routing advertisements that the failed ASE was advertising.

4. The system according to claim 1, wherein said ASEs are configured to elect said master ASE by an election/re-election, and the election/re-election is initiated when one of said ASEs determines that it can not reach a current master ASE.

5. The system according to claim 1, wherein the ASEs are configured to participate in said election/re-election if at least one of said the other ASEs do not receive at least one of said regular messages from the current master ASE, and the election/re-election is exchanging messages among the ASEs that participate in the election/re-election.

6. The system according to claim 1, wherein the master ASE is configured to send regular messages to the other ASEs indicating that the master ASE is active.

7. The system according to claim 1, wherein said ASEs are configured to elect an ASE as a master ASE upon determining that none of the ASEs is operating as a master ASE, and said election comprises electing one of the ASEs as a master ASP by each ASE exchanging with the other ASEs multicast or broadcast messages indicating a software revision and a commissioned IP address wherein said ASE with the most current software and configuration, and within that with the lowest identity value, becomes the master ASE after the messages are examined.

8. The system according to claim 7, wherein the ASE elected as the master ASE is configured to set the software release data of the master ASE to a new software release, update the active ASEs and redundant ASEs to the new software, and subsequently reset the master with the new release.

9. A method of providing backup processing, comprising:
    using a plurality of application processing engines (ASEs) for processing IP packet flows of subscribers, the plurality of ASEs including a plurality of active ASEs and at least one standby ASE;
    determining of any of the ASEs is operating as a master ASE and if not, electing on of the ASEs as a master ASE, the master ASE to operate differently from the standby ASEs, based at least on software releases being used by each of the ASEs;
    the master ASE assigning some of said ASEs as active ASEs and some of said ASEs as standby ASEs;
    updating the software on the ASEs to a new software release by first setting the software release data of the master ASE to the new software release, updating the active ASEs and standby ASEs to the new software release, and subsequently resetting the master ASE to run the new software on the master ASE;

the master ASE forming a redundancy group of the ASEs based on a configuration of IP packet flows of subscribers;

determining how many active ASEs are needed in the redundancy group to support an operational configuration of the IP packet flows of subscribers;

determining if there is an active ASE performing a determined configured function and if so, allowing the function to continue to be performed and assigning other configured functions to available ASEs not assigned a configuration in the redundancy group;

multicasting or broadcasting subscriber state data from each of the active ASEs to each of the standby ASEs;

maintaining received subscriber state data at each standby ASE for each active ASE;

detecting failures of the at least one active ASEs; and on detecting a failure of one of the active ASEs, activating one of said at least one standby ASEs to substitue for the failed ASE, including advertising the interfaces of the activated standby ASE and if necessary, the routing advertisements that the failed ASE was advertising.

10. The method according to claim 9, further comprising directing IP packet flows of subscribers to the ASEs based on interface addresses that are known to neighbors advertised with address resolution protocol (ARP).

11. The method according to claim 9, further comprising the master ASE sending regular messages to let the other ASEs know that the master ASE is active and holding an election/re-election to establish a new master ASE when at least one of said ASEs does not receive one of said regular messages, said election/re-election including participation by at least two of the ASEs through exchanging messages indicating a software revision and a commissioned IP address of each of the at least two of the ASEs, wherein the ASE with the most current software and configuration, or in the event of a tie, the ASE with the lowest commissioned IP address, becomes master ASE after the messages are examined.

* * * * *

UNITED STATES PATENT AND TRADEMARK OFFICE
CERTIFICATE OF CORRECTION

PATENT NO.        : 7,586,838 B2
APPLICATION NO.   : 10/873965
DATED             : September 8, 2009
INVENTOR(S)       : David Hiroshi Sonoda It is certified that error appears in the above-identified patent and that said Letters Patent is hereby corrected as shown below:

In column 7, line 65, ...be a master ASP... should read -- be a master ASE--.
    In column 8, line 6, ...ASP forms a... should read -- ASE forms a --.
    In column 8, line 38, ...a master ASP... should read -- a master ASE --.

Signed and Sealed this

Twenty-ninth Day of June, 2010

David J. Kappos
*Director of the United States Patent and Trademark Office*